R. W. MYERS.
DYNAMO ELECTRIC MACHINE.
APPLICATION FILED NOV. 26, 1918.
1,396,521.
Patented Nov. 8, 1921.
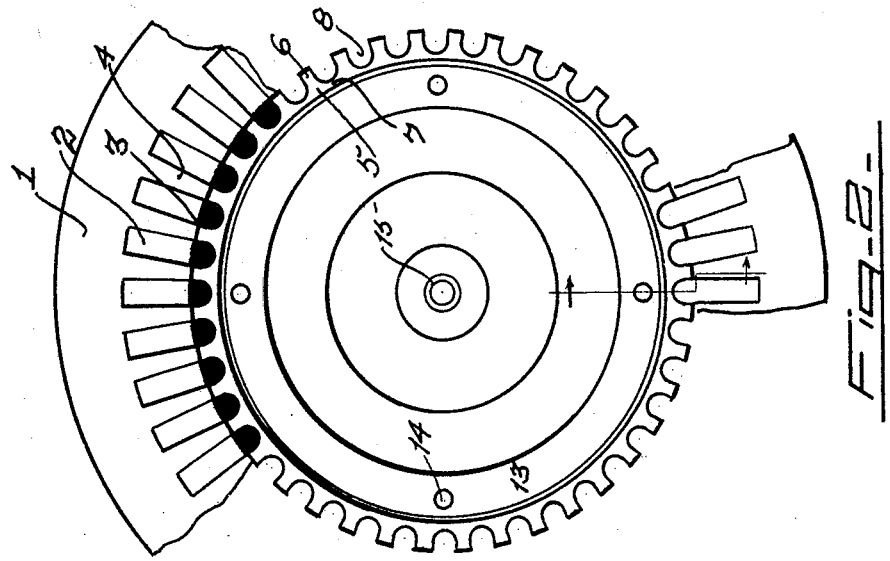
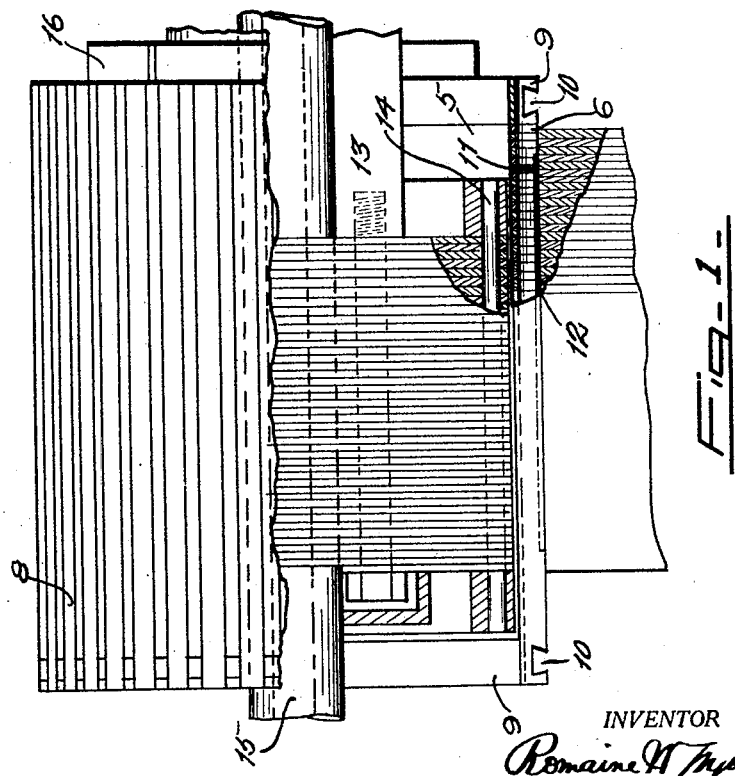
WITNESS
INVENTOR
Romaine W. Myers
BY
Acker & Toller
ATTORNEYS

UNITED STATES PATENT OFFICE.

ROMAINE W. MYERS, OF OAKLAND, CALIFORNIA.

DYNAMO-ELECTRIC MACHINE.

1,396,521.   Specification of Letters Patent.   Patented Nov. 8, 1921.

Application filed November 26, 1918. Serial No. 264,144.

*To all whom it may concern:*

Be it known that I, ROMAINE W. MYERS, a citizen of the United States, residing at Oakland, in the county of Alameda and State of California, have invented certain new and useful Improvements in Dynamo-Electric Machines, of which the following is a specification.

It is advantageous in dynamo-electric machines to construct the surface of the core to present as nearly as possible an unbroken area of magnetic material to effect a uniform distribution of the flux.

Heretofore slot closing devices have been employed in most cases in the form of a single or built up construction commonly termed a key, which are independently inserted for closing the open end of the coil receiving slots, and which also serve to retain the coils within the slots, the removing of the keys permitting the ready and rapid winding of the coils within the slots, and said open slot machines in this manner have many advantages over what are commonly termed the closed slot machines. In closed slot machines the windings are difficult to repair in case of breakdown which disadvantage is overcome by utilization of means for closing the slots of the open slot machines.

The present invention has for its principal objects to provide a construction adapted preferably for insertion as a unit to simultaneously close the open ends of all the slots of the stator to retain the coils within the slots and to overcome the objection of a plurality of independent keys each adapted for closing one slot of the stator.

The invention consists primarily in an annulus or ring magnetic extension preferably of the laminated form suitably held together or united and inserted as a unit within the interior of the stator to close the open ends of the slots and to retain the coils therein, so that the magnetizing current is decreased for the same winding and the pulsation loss almost eliminated.

With the above mentioned and other objects in view the invention consists in the novel construction and combination of parts hereinafter described, illustrated in the accompanying drawings, and set forth in the claims hereto appended, it being understood that various changes in the form, proportion, size and minor details of construction within the scope of the claims may be resorted to without departing from the spirit or sacrificing any of the advantages of the invention.

Referring more particularly to the several views of the drawings,

Figure 1 is a detailed view in broken section illustrating one embodiment of my invention.

Fig. 2 is a view in broken end elevation of the construction illustrated in Fig. 1.

In the drawings, 1, indicates the built-up or laminated full open slot stator within the recesses 2 or which are adapted to be inserted from the open top 3 thereof suitable windings or coils not shown, the recesses being separated by the teeth or projections 4. By forming the slots 3 with full open top 3 the coils inserted within the same may be wound or formed exteriorly of the machine in looped formation and inserted as a unit to straddle the teeth 4, one portion of each coil lying in opposite sides of its respective tooth and receivable in adjacent slots 2. The laminations of stator 1 are retained together by any suitable mechanism well known in the art.

Disposed within the stator 1 and constructed preferably in laminated form is a suitable magnetic extension or annulus 5, the peripheral surface of which is formed at spaced intervals with the outwardly projecting teeth 6 adapted when the annulus is inserted as a unit within the stator 1 to contact one with the end or terminal portion of each tooth 4 and the material 7 of said annulus between said teeth 6 thereof providing a closure for the tops of the slots 4 and retaining the coils in position within said slots.

The laminations are retained together preferably by a suitable substance such as glass, enamel or bakelite which is deposited within the recesses, grooves or depressions 8 separating the teeth 6, thus providing a plurality of uniting strips extending longitudinally of the entire width of the magnetic extension. If desirable, suitable end members 9, preferably of annular formation may be positioned at opposite ends of the magnetic extension and the same are provided with the circumferential grooves 10, preferably dove-tailed in cross-section and which are also filled with the above mentioned uniting material, thus providing an interlaced or honey-combed construction for retaining the laminations so that the same will form a solid unit. The peripheral surface of the magnetic extension is formed at points a slight distance removed from the extreme end laminations with an annular depression 11 of a slight depth which is filled with suitable insulating material 12 preferably of the type above described which reduces the liability of magnetic losses should the laminations of the magnetic extension 4 overlap or not directly coincide with the laminations forming the stator 1. The inner peripheral surface of the magnetic extension 5 is preferably coated with a suitable substance such as enamel which is necessary when the apparatus is used in connection with liquids or fluids which attack the metal and which pass through the air gap between the magnetic extension and the rotor hereinafter described.

Rotatably mounted within the magnetic extension 5 with its periphery in slight spaced relation to the inner peripheral surface of the said magnetic extension is a rotor 13 preferably constructed of suitable laminations which are retained together by the rotor bars 14, the rotor in this case being supported on a tubular shaft 15 and carrying at one end a suitable vane 16 for generating an air current through the rotor.

The laminations forming the magnetic extension or annulus 5 are preferably stamped or cut from sheet material in any suitable manner and it is desirable to form these laminations circumferentially continuous although if desirable the laminations may be divided transversely in halves or quarters which would require that each section forming the annulus would be required to be inserted independently into the stator.

By my improved construction it would be apparent that the magnetic extension within which the rotor operates is capable of insertion within and removal from the stator as a unit and that such insertion or removal requires but one operation, thus enabling the construction to be installed or removed in considerably less time than where independent keys are employed for closing each of the respective slots.

By my improved construction I materially reduce the magnetic losses in this type of apparatus, and materially increase the efficiency thereof over apparatus of the same relative size and power and also provide a means adapted for simultaneously closing a plurality of the stator slots at the time of its positioning within the stator.

Having thus described my invention what I claim as new and desire to protect by Letters Patent is:

1. In a dynamo-electric machine comprising a slotted stator and a rotor, means for closing the slots of the stator and for retaining the coils therein, the same comprising a cylindrical member interposed between the stator and rotor and within which the rotor operates, the peripheral surface of said cylindrical member intermediate of its side walls being formed with a shallow annular depression whereby a portion of said member will lie in slight spaced relation to the end surface of the teeth of said stator forming the slots thereof.

2. In a dynamo-electric machine comprising a slotted stator and a rotor, means for closing the slots of the stator and for retaining the coils therein, the same comprising a cylinder formed of circumferentially continuous laminations having a toothed periphery, the teeth of adjacent laminations being arranged in parallel alinement longitudinally of the cylinder providing grooves extending longitudinally of the cylinder, the said cylinder adapted for insertion as a unit within the stator with the longitudinal rows of the teeth thereof lying one in coöperative relation with each of said rows of teeth separating said coil receiving slots.

3. In a dynamo-electric machine comprising a slotted stator and a rotor, means for closing the slots of the stator and for retaining the coils therein, the same comprising a cylinder formed of circumferentially continuous laminations having a toothed periphery, the teeth of adjacent laminations being arranged in parallel alinement longitudinally of the cylinder providing grooves extending longitudinally of the cylinder, the said cylinder adapted for insertion as a unit within the stator with the rows of the teeth thereof lying one in coöperative relation with each of said rows of teeth separating said coil receiving slots, said grooves adapted for receiving a body of insulating material for retaining said laminations together.

4. In a dynamo-electric machine comprising a slotted stator and a rotor, means for closing the slots of the stator and for retaining the coils therein, the same comprising a cylinder formed of magnetic material interposed between the stator and rotor and within which the rotor operates, said cylinder having a varying radial thickness and a relatively high resistance medium disposed longitudinally of said cylinder.

5. A dynamo-electric machine comprising a slotted stator and a rotor, means for closing the slots of the stator and for retaining the coils therein, the same comprising a cylinder of magnetic material interposed between the stator and the rotor and within which the rotor operates, the periphery of the cylinder being longitudinally grooved and arranged with the grooves registering with the open tops of the stator slots and a relatively high resistance material within the grooves of the cylinders.

6. A dynamo-electric machine comprising a slotted stator and a rotor, means for closing the slots of the stator and for retaining the coils therein, the same comprising a cylinder of magnetic material interposed between the stator and the rotor and within which the rotor operates, and a plurality of relatively high resistance members carried by said cylinder and extending longitudinally thereof.

In testimony whereof I have signed my name to this specification in the presence of two subscribing witnesses.

ROMAINE W. MYERS.

Witnesses:
    HARRY A. TOTTEN,
    D. B. RICHARDS.